(12) United States Patent
Mercado

(10) Patent No.: US 7,517,204 B2
(45) Date of Patent: Apr. 14, 2009

(54) SYSTEM FOR PRODUCING A SOLID PRODUCT FROM A POWDERY MATERIAL

(75) Inventor: Henri Mercado, Saint Denis les Bourg (FR)

(73) Assignee: Medelco, Bourg em Bresse (FR)

( * ) Notice: Subject to any disclaimer, the term of this patent is extended or adjusted under 35 U.S.C. 154(b) by 686 days.

(21) Appl. No.: 10/557,084

(22) PCT Filed: May 19, 2004

(86) PCT No.: PCT/FR2004/001251

§ 371 (c)(1),
(2), (4) Date: Nov. 17, 2005

(87) PCT Pub. No.: WO2004/103689

PCT Pub. Date: Dec. 2, 2004

(65) Prior Publication Data

US 2007/0031530 A1 Feb. 8, 2007

(30) Foreign Application Priority Data

May 20, 2003 (FR) .................................. 03 06032

(51) Int. Cl.
*B29C 43/32* (2006.01)
(52) U.S. Cl. .......................... 425/78; 425/345; 425/353; 425/411
(58) Field of Classification Search .................... 425/78, 425/193, 194, 344–345, 352–355, 411
See application file for complete search history.

(56) References Cited

U.S. PATENT DOCUMENTS

| 2,970,485 A | | 7/1961 | Frank .............................. 74/55 |
| 4,662,234 A | | 5/1987 | Yokoyama .................... 74/393 |
| 6,106,262 A | * | 8/2000 | Levin et al. .................. 425/345 |

FOREIGN PATENT DOCUMENTS

| DE | 609 211 | 10/1935 |
| EP | 0 594 104 | 4/1994 |
| FR | 2 791 602 | 10/2000 |
| GB | 955 665 | 4/1964 |
| GB | 1 141 114 | 1/1969 |

* cited by examiner

Primary Examiner—Yogendra Gupta
Assistant Examiner—Thu Khanh T Nguyen
(74) Attorney, Agent, or Firm—Heslin Rothenberg Farley & Mesiti P.C.

(57) ABSTRACT

An installation for the production of a solid product from a powdered material comprises: a powdered material supplier; a die for receiving the material and forming the solid product to be produced; an upper punch which can co-operate in the die and which is driven in translation by a lower motorized cam; and a lower punch which can also co-operate with and in the die and which is driven in translation by an upper motorized cam. The upper and lower cams rotate in a synchronized manner. Moreover, the cam(s) are provided with an outer deformable profile which is intended to provoke particular actions from the punch that is moved in translation thereby.

16 Claims, 14 Drawing Sheets

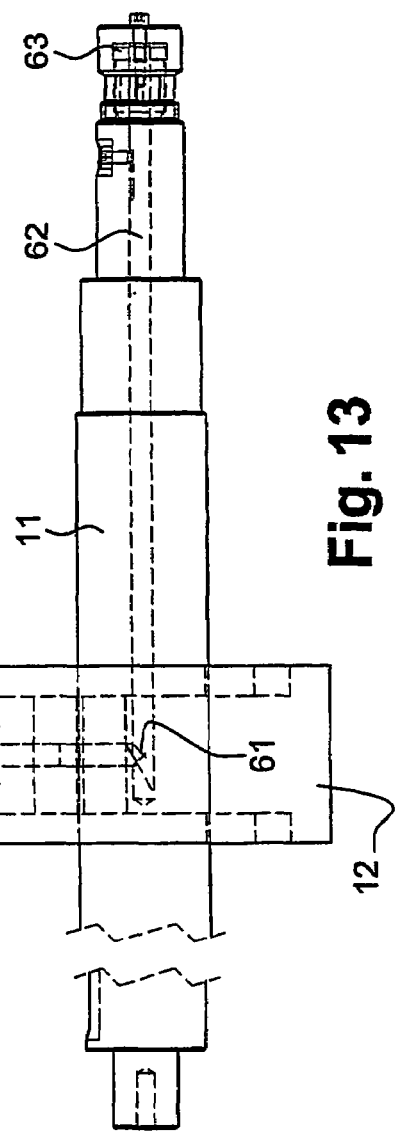
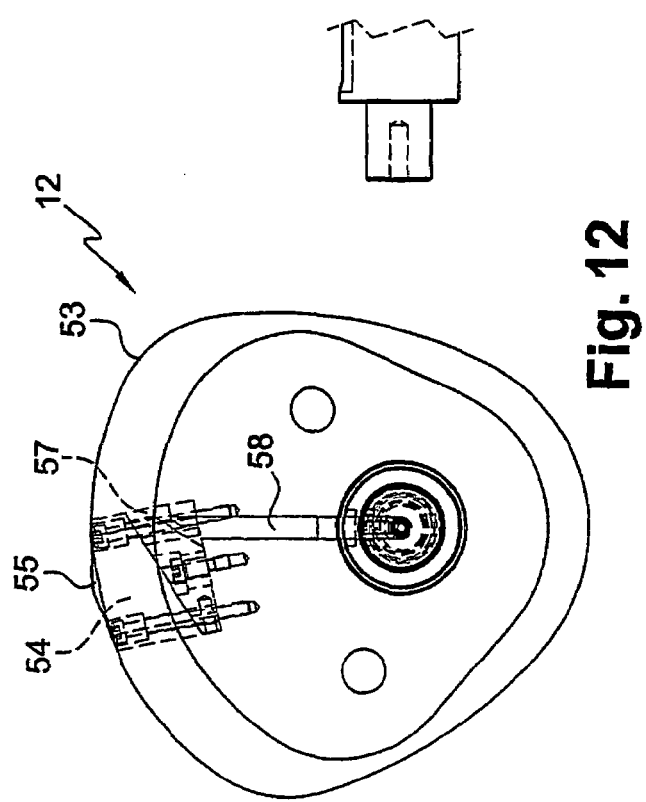
Fig. 12
Fig. 13

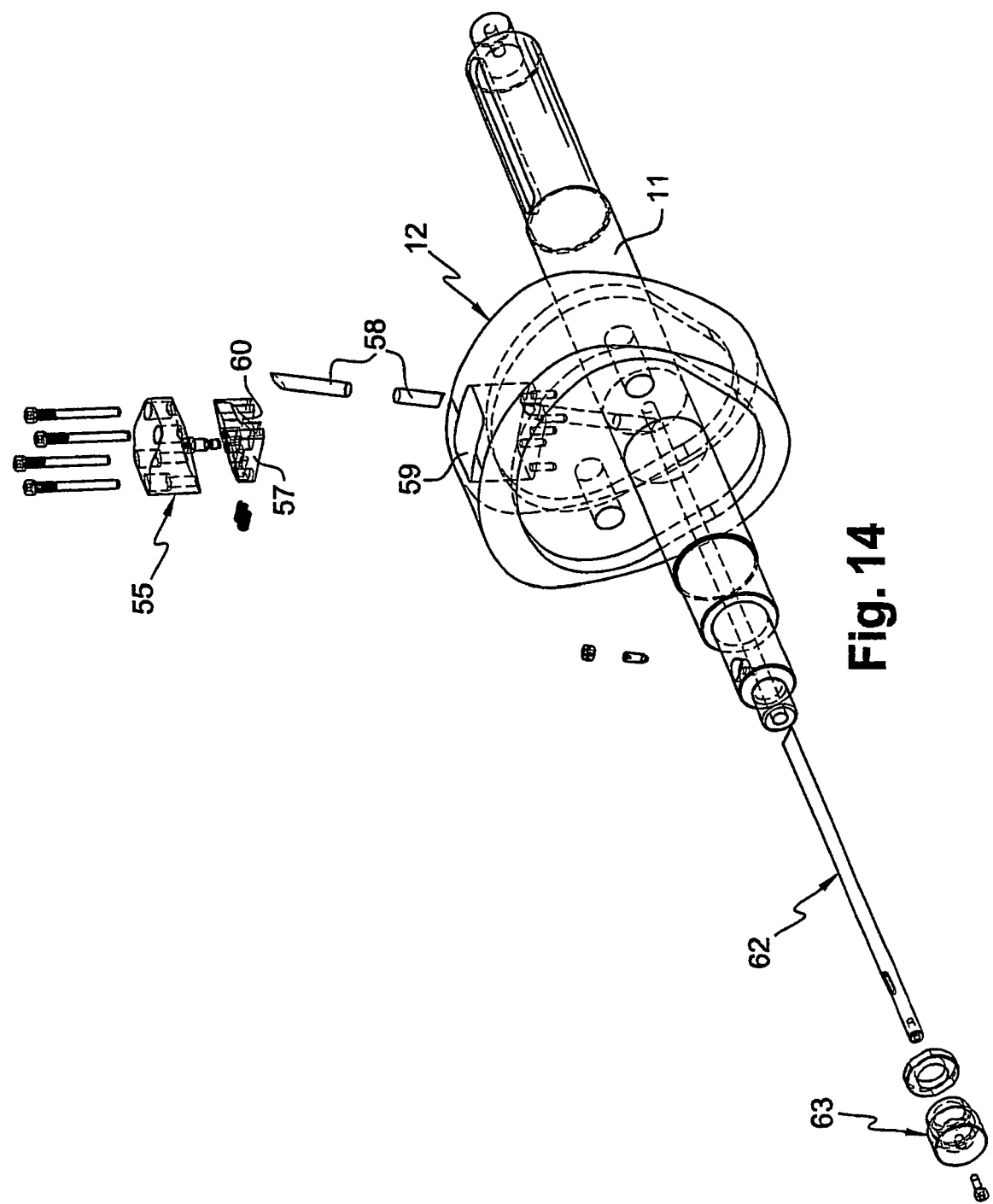

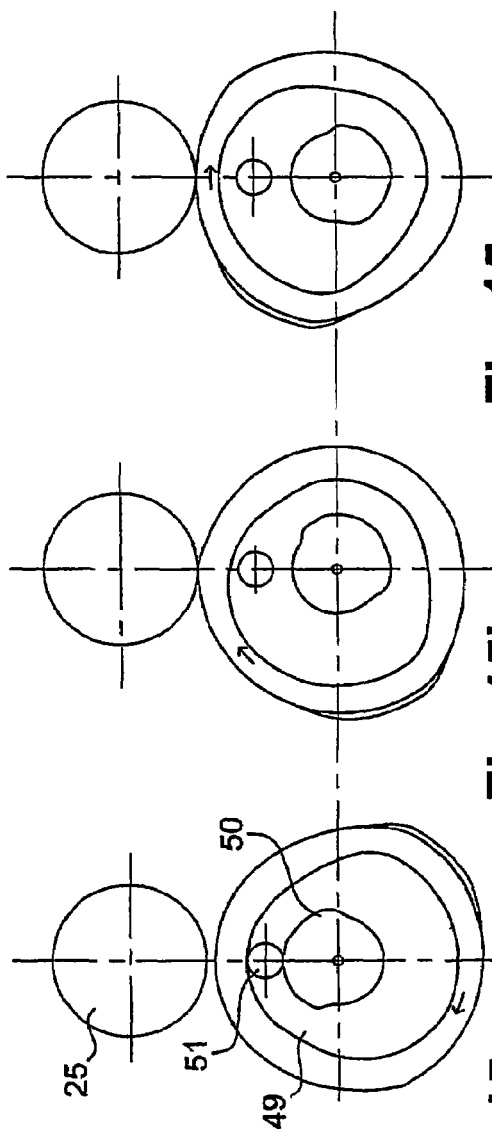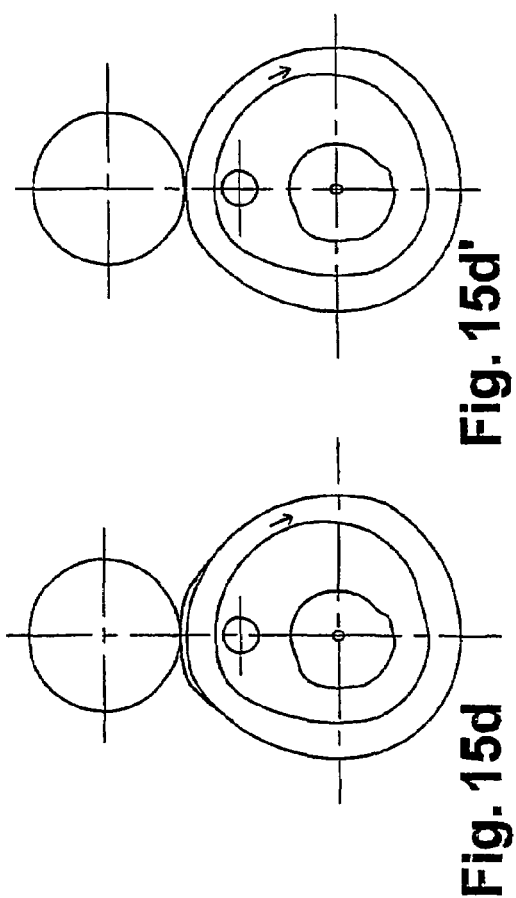

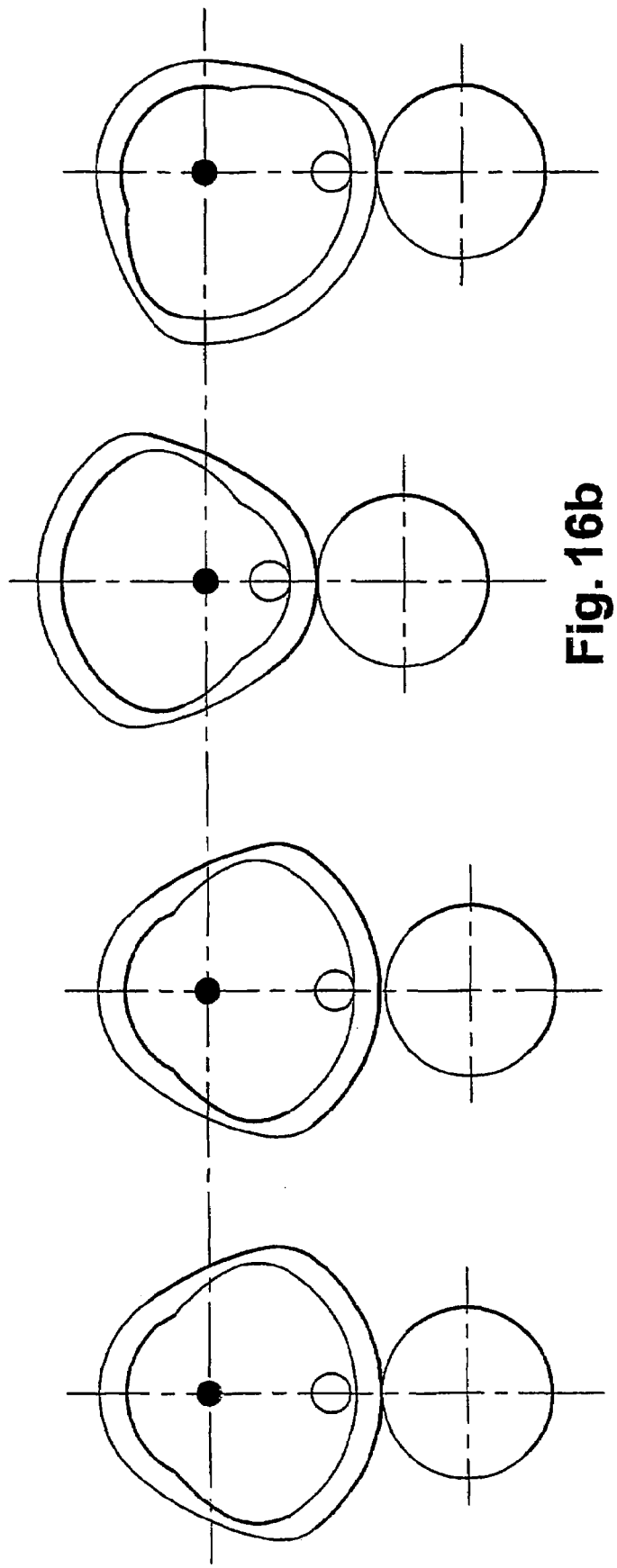

SYSTEM FOR PRODUCING A SOLID PRODUCT FROM A POWDERY MATERIAL

CROSS REFERENCE TO RELATED APPLICATIONS

This application is a 371 filing of PCT International application no. PCT/FR2004/001251 filed May 19, 2004 and published in French as WO 2004/103689 A1 on Dec. 2, 2004 which claims priority of French application no. 03.06032 filed May 20, 2003, the disclosures of which are hereby incorporated herein by reference in their entirety.

BACKGROUND OF THE INVENTION

The invention relates to a system for producing a solid product from a powdery material.

More specifically, it relates to the production of tablets, compressed tablets and other doses more particularly intended for pharmaceutical and chemical uses.

Traditionally, the production of such solid products involves compression of the powdery raw material in a die, this compression being obtained by means of punches that slide into said die, especially an upper punch and a lower punch.

Each of these two punches is therefore powered, for example by means of a connecting rod/crankshaft system that makes it possible to vary the height of translation of said punches.

However, the use of such a system to drive the punches has certain disadvantages which include the significant inherent inertia of the system used.

At the same time, there are also reliability problems in terms of the cohesion of the resulting solid product to the extent that cracking or lack of cohesion of the product is frequently observed resulting in return to its powdery form.

The invention also aims to provide a system capable of simulating all types of machines capable of producing or manufacturing such solid products from a powdery material in order, in particular, to resolve the production problems resulting from operating modes, the particle size of said powdery material, the conditions under which the solid products are produced (humidity, temperature, etc.).

In fact, this problem associated with developing the process for manufacturing said solid products and especially the conditions under which the system intended to produce them is used is crucial, in particular as a cost driver.

This has proved especially true in the pharmaceutical industry where. the cost of the active principle in the composition of the medication is extremely high and, consequently, any lost production due to lack of cohesion of the end product entails huge losses for the manufacturer or laboratory.

The need to produce a system for reliable testing of machines used to produce such solid products is therefore most urgent.

To achieve this, a device intended to achieve the desired objective has been proposed, for example in document FR-A-2,791,602. This device, illustrated in FIGS. 1 and 2, comprises means of driving the upper and lower punch respectively consisting of a first and second means of transmission kinematically interposed between the motor means and said first and second punches, this means of transmission including a first and a second cam respectively.

This arrangement eliminates sinusoidal movement of the punches associated with the prior art by linear movement which improves the compression phase.

In fact, it is possible to keep the compacted powdery material under pressure and this makes it possible to expel air from it therefore reducing, to a large extent, the risk of bursting and at least disintegration of the solid product thus formed.

In addition, the use of cams makes it possible to easily modify the cycle rate of the punches depending on the nature of the powdery products used and the conditions under which they are produced, therefore enhancing the adaptability of the device.

BRIEF SUMMARY OF THE INVENTION

The object of the present invention relates to a system of the type in question making it possible to optimise the respective displacement of the upper and lower punches respectively by altering the special profile of the cams.

Thus, this system for producing a solid product from a powdery material comprises:
 means of feeding the powdery material;
 a die to contain said material and shape the solid product to be produced;
 an upper punch capable of cooperating in said die and moved translationally by a driven lower cam;
 a lower punch also capable of cooperating with and in said die, translationally moved by a driven upper cam;
 rotation of said upper and lower cams respectively being synchronized.

It is characterised in that at least one of said cams has a variable outer profile intended to cause particular actions of the punch(es) of which it or they ensure(s) translational movement.

Thus, in the case of the upper cam, the use of a variable cam path resulting in a particular travel of the lower punch can result in improved ejection of the solid product after its completion.

According to the invention, the lower cam is also capable of having a variable outer profile intended to make it possible to obtain a product pre-compression phase that encourages, much more so than in the device according to the prior art, the venting of air trapped between the two punches prior to the compression phase strictly speaking, thereby resulting in improved cohesion of the end product.

According to another aspect of the invention, the mechanical effect of the system that is inherent in the use of a variable outer profile on the cam(s) is combined with a kinetic effect that is inherent in the possible variation of the rotation speed of said cams. To achieve this, an electronic variable-speed drive is mounted on the reduction gear upstream from the drive shaft of said cams.

According to another aspect of the invention, the upper cam also has two non-circular inner cam profiles intended to cooperate periodically with a cam follower loosely rotatably mounted relative to a shaft that is parallel to the rotating shaft of the cam and mounted between the two inner profiles of said cam.

The rotation shaft of this inner follower is also joined to the means of imparting movement to the lower punch, thus making it possible to momentarily prevent cooperation between the outer profile of the cam and the movable upper follower in order to thereby ensure a phase during which the powdery material is filled and leveled off in the die.

BRIEF DESCRIPTION OF THE DRAWINGS

The way in which the invention can be implemented and its resulting advantages will be more readily understood from the description of the embodiment given below, merely by way of example, reference being made to the accompanying drawings.

FIG. 12 is a transverse cross-sectional view of the lower cam in its pre-compression position, FIG. 13 being a longitudinal cross-sectional view thereof.

FIG. 14 is an exploded view of the lower cam.

FIGS. 15a to 15d or 15d' are schematic views showing the various operating phases of the upper cam.

FIGS. 16a to 16c are schematic views showing the various operating phases of the lower cam.

DETAILED DESCRIPTION

The following description is more especially geared towards a system for testing the production of compressed tablets for medical use. Obviously, it is understood that the invention has applications other than this alone.

Figure 1:
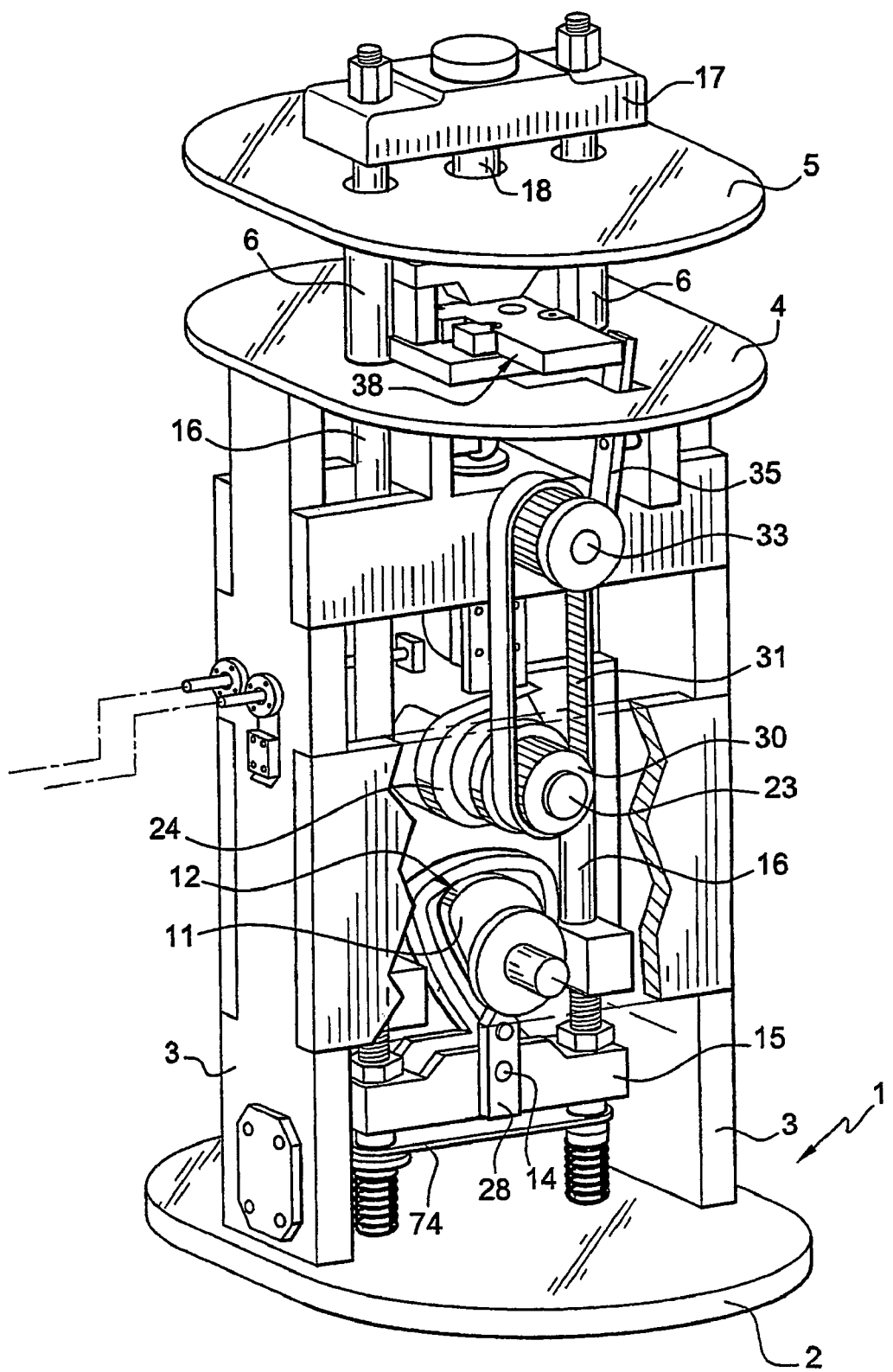
FIG. 1 is a schematic view of a system according to the prior art.
Figure 2:
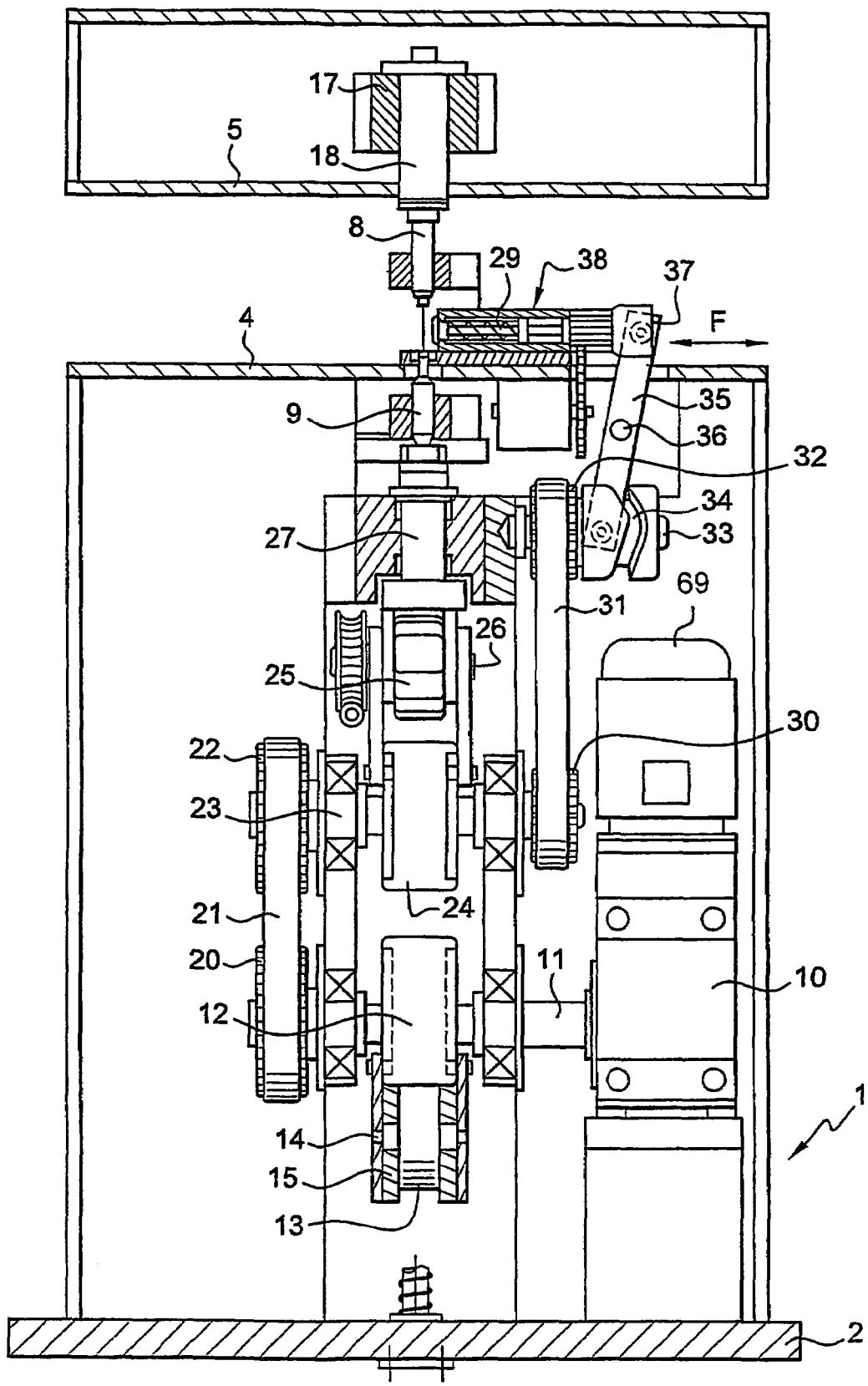
FIG. 2 is a vertical transverse cross-sectional view of the system according to the prior art.
Figure 3:
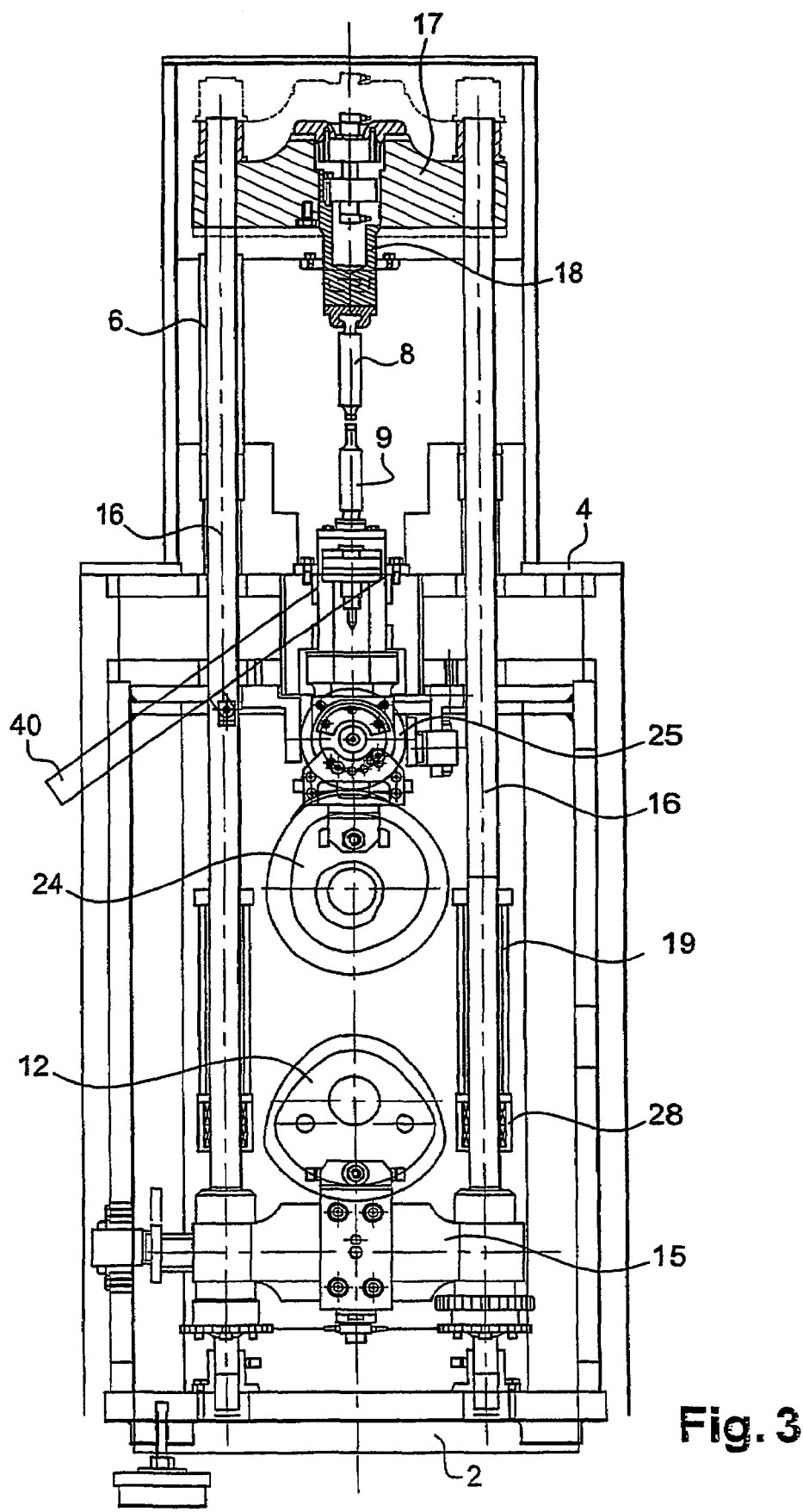
FIG. 3 is a schematic longitudinal cross-sectional view of the system according to the invention.

FIGS. 1 and 2 show a system according to the prior art with which the invention shares certain features, besides its operating principle.

This system fundamentally comprises a frame (1) having a base (2) from which two vertical lateral uprights (3) extend. These uprights (3) support a first horizontal plate (4) which is itself joined to an upper plate (5) by means of hollow vertical sleeves (6).

As stated in the preamble, the system according to the invention uses, inside a die (7) located on horizontal plate (4), actuation of two punches, upper punch (8) and lower punch (9) respectively, that make a straight reciprocating movement, in this case vertical movement.

Upper punch (8) is driven as follows. A motor (69) associated with reduction gear (10) ensures rotation of a shaft (11) at a specified speed. The speed of this shaft (11) consequently drives rotation of a cam, referred to as the lower cam (12) at the same rotation speed.

However, according to one advantageous aspect of the invention, reduction gear (10) mounted upstream from drive shaft (11) is associated with a variable-speed drive (not shown) that is electronically programmed making it possible to vary the effective rotation speed of said cam. Such a variable-speed drive, called a variable-speed cam drive motor, is marketed by German firm LENZE under the type designation 9326EK.

This cam (12) has an outer profile intended to cooperate with a follower (13) referred to as the power follower, which is loosely-rotatably mounted and the rotation shaft (14) of which is parallel to shaft (11) and joined by means of a cross piece (15) to two vertical columns (16) that extend over the entire height of the lateral uprights (3). These columns (16) pass through sleeves (6) and their upper ends are connected by a cross piece (17) to which a support (18) of the upper punch (8) is attached. It is apparent that cooperation of the outer profile of the lower cam (12) with power follower (13) makes it possible to impart a straight reciprocating movement to punch (8) through vertical columns (16) and support (18).

In order to make the assembly thus formed lighter and not affect movement of the upper punch, said columns (16) are each fitted with a weighted spring of the helical spring type (19) that is wound around columns (16) and the upper end of which is attached to said columns, the lower end of which rests on a ring (28) attached to the frame.

The way in which the lower punch (9) is driven will now be described. The rotary drive axis or shaft (11) of the lower cam (12) extends as a pulley or a cogwheel (20) around which a belt, possibly toothed, (21) is wound or engages and is also wound around another upper pulley or cogwheel (22).

Given this, it drives rotation of an axis or shaft (23) that is parallel to shaft (11) and also drives rotation of a cam referred to as the upper cam (24).

The outer or peripheral profile of cam (24) is intended to cooperate with a loosely-rotatably mounted power follower (25), the rotation shaft of which (26) is joined to a support (27) of the lower punch (9).

Once again, rotation of upper cam (24) through cooperation with power follower (25) imparts a reciprocating upward or downward movement to lower punch (9) in line with movement of upper punch (8).

Simultaneously, the system according to the invention is equipped with a device to feed the die with the powdery product. To achieve this, rotating shaft (23) of upper cam (24) extends as a pulley or cogwheel (30) onto which a belt, for example a toothed belt, (31) engages thereby driving rotation of a pulley or cogwheel (32). A rotating shaft (33) is driven by cogwheel (32). This rotating shaft (33) is provided with a peripheral groove (34). The lower end of a connecting rod (35) rests against this groove (34), said connecting rod (35) being articulated about one axis (36) and its other end (37) being connected to the feed device (38) capable of moving on horizontal plate (4).

Because groove (34) has a substantially sinusoidal profile, rotation of shaft (33) drives reciprocating horizontal movement of feed device (38) in the direction of arrow F in FIG. 2.

Figure 4:
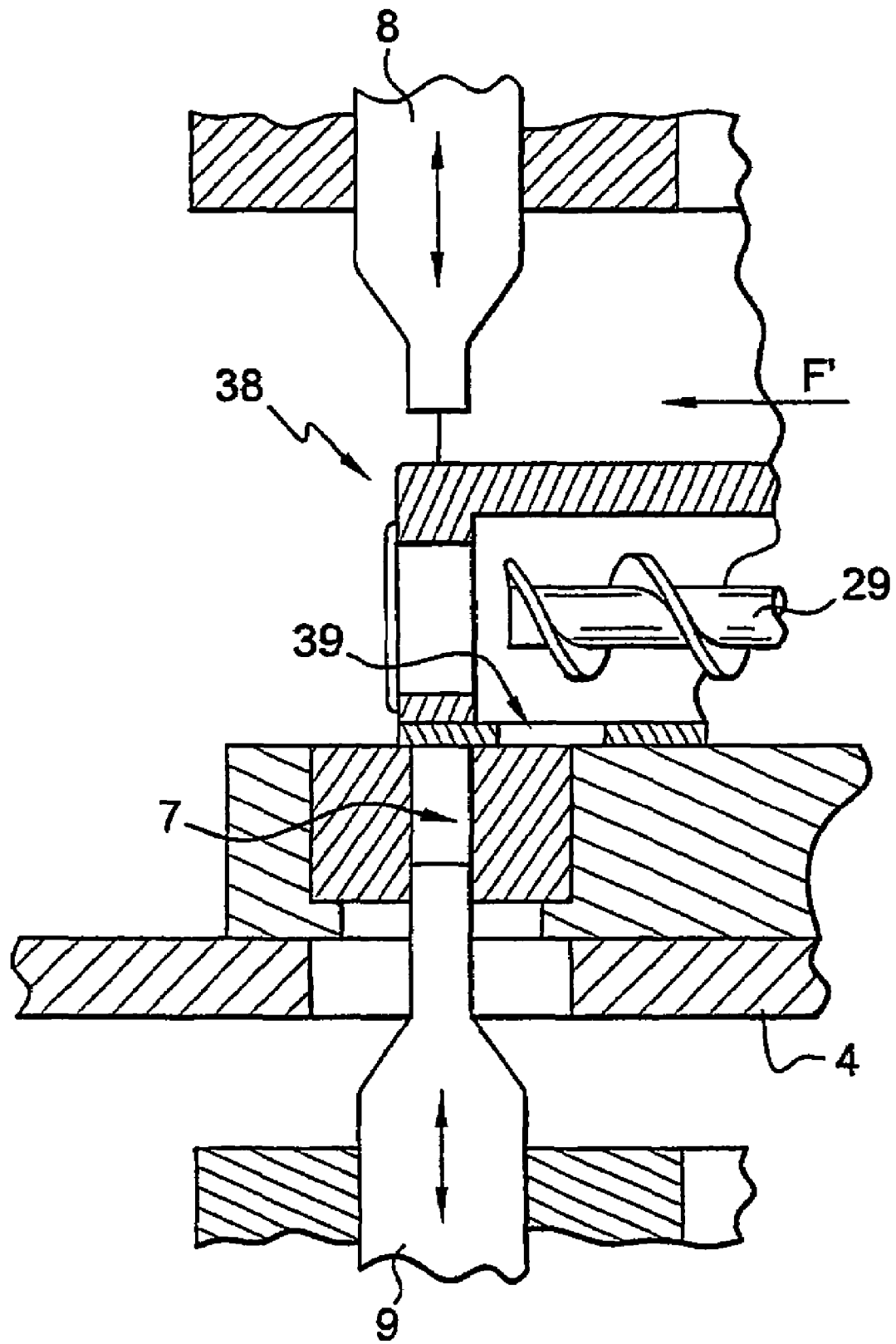
FIG. 4 is a partial longitudinal cross-sectional view showing the operating principle of the punches in the die in greater detail.
Figure 6:
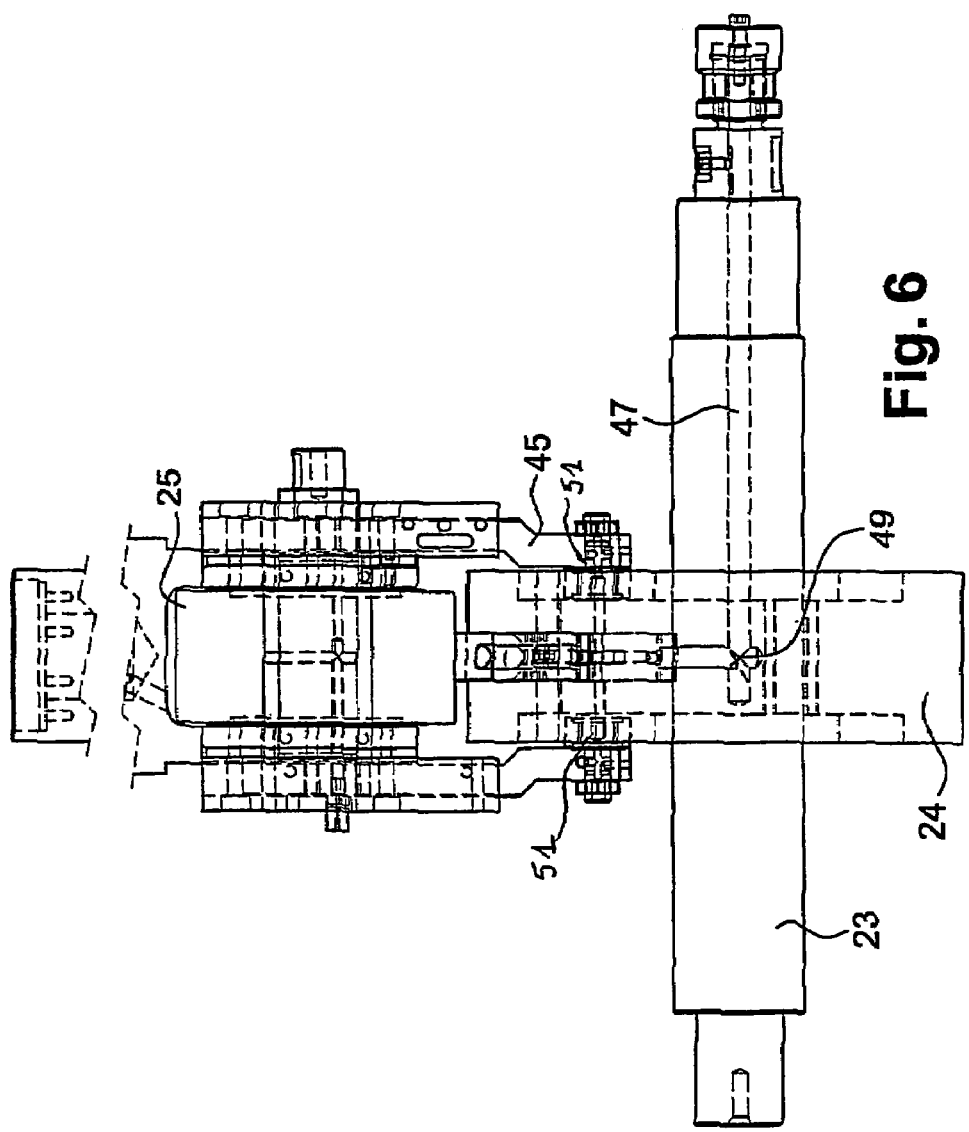
FIG. 6 is a longitudinal cross-sectional view of FIG. 5.

FIG. 4 shows, in greater detail, the die and the lower end of upper punch (8) and the upper end of lower punch (9) respectively.

Such a feed device (38) is equipped with one or two feed screws (29) rotatably actuated in order to force the powdery material that it contains towards an aperture (39) inside said device that opens into the die (7) in order to release the powdery material into it when said aperture (39) is vertically above the die.

The discharge hopper for the completed compressed tablets is shown as (40).

The structure of the upper cam (24) will now be described in greater detail making reference to FIGS. 5 to 11.

As already stated, this cam is mounted on drive shaft (23). It comprises an outer cam path or profile (41) intended to cooperate with a freely rotatable power follower (25) joined by its rotation shaft (42) parallel to drive shaft (23) at the level of side plates (45) to lower punch (9).

Figure 5:
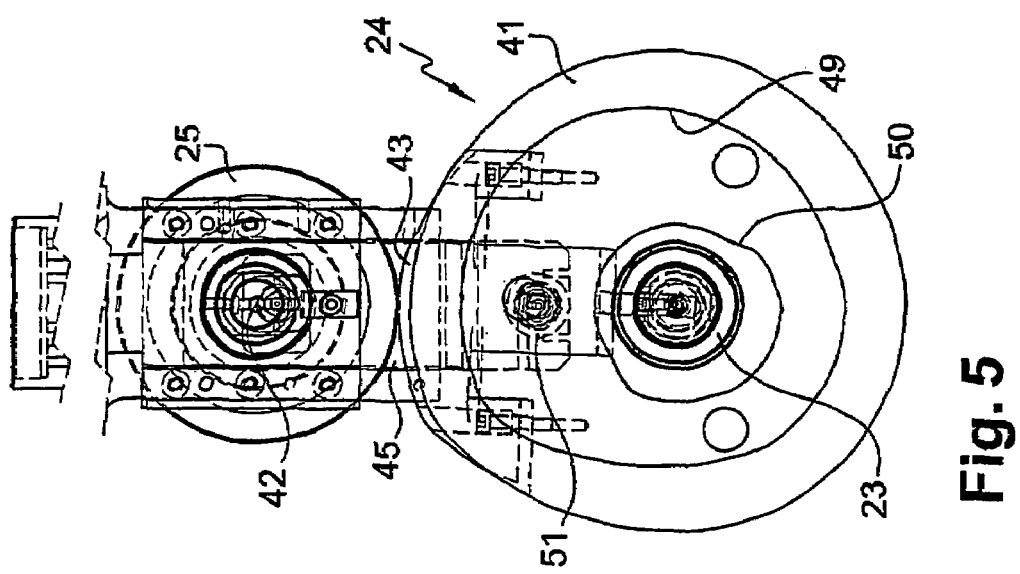
FIG. 5 is a schematic transverse view of the upper cam in its position when the shaped product is ejected.
Figure 8:
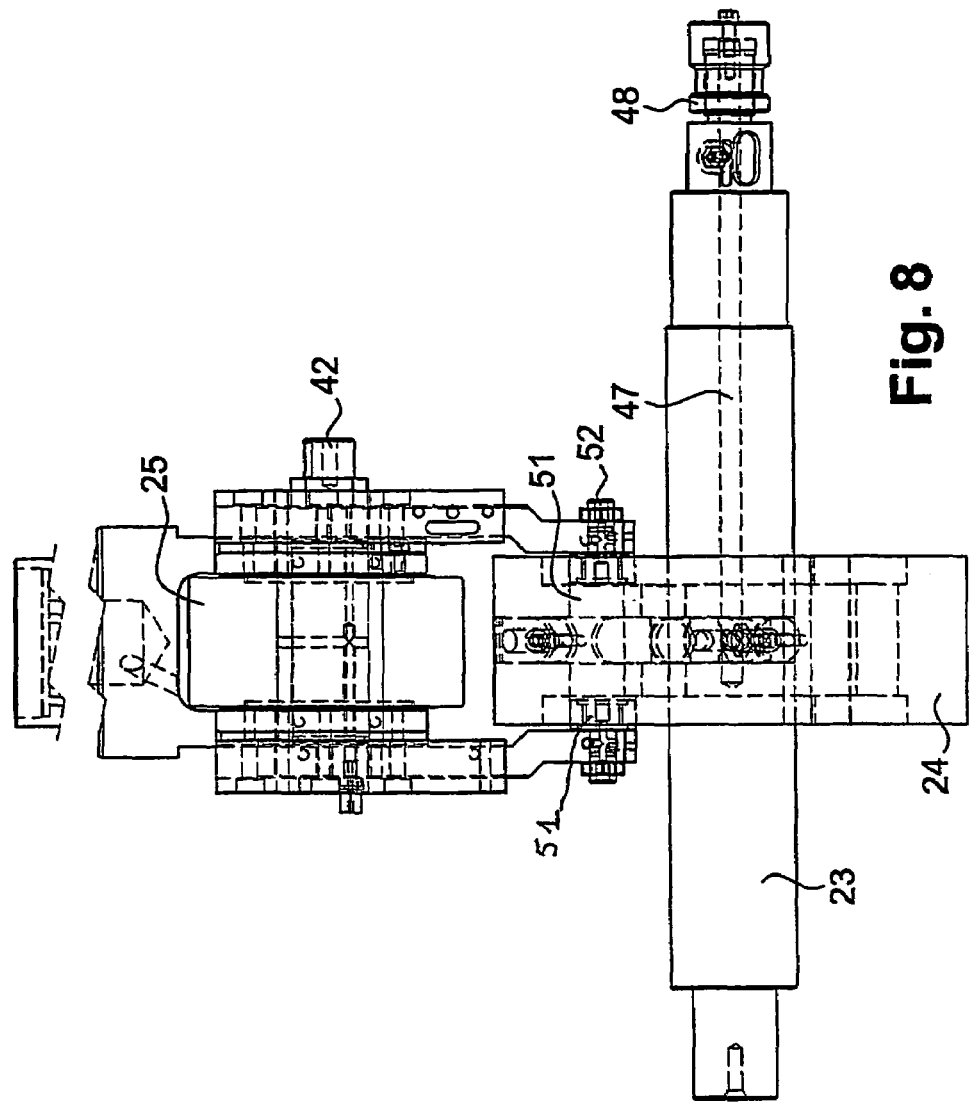
Figure 7:
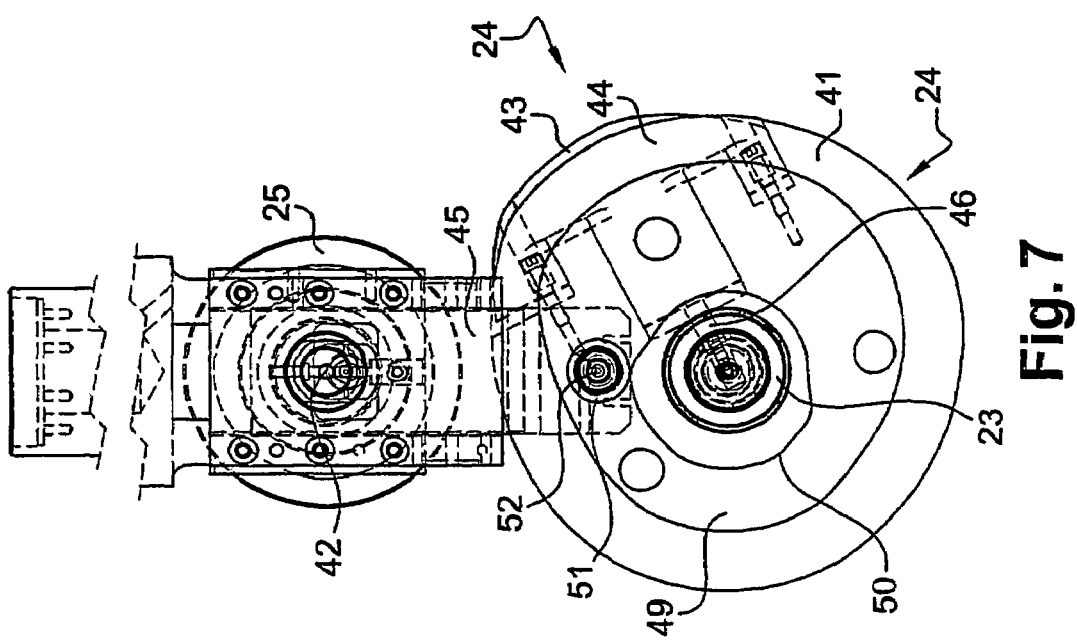
FIG. 7 is a view similar to that in FIG. 5 when the cam is in another position for the phase when ejection of the compressed tablet made during the preceding cycle is completed and when a new cycle is started by filling the die with powder, FIG. 8 being a longitudinal cross-sectional view thereof.
Figure 10:
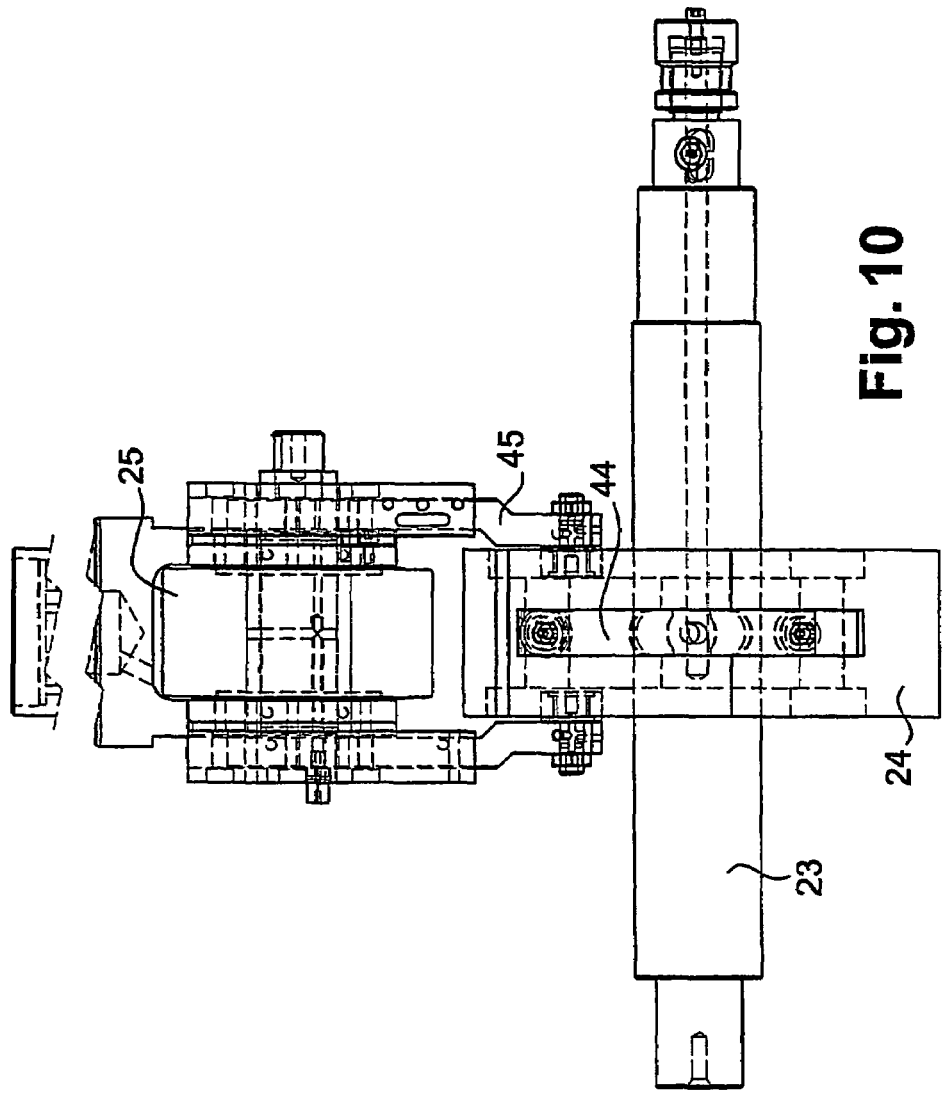
Figure 9:
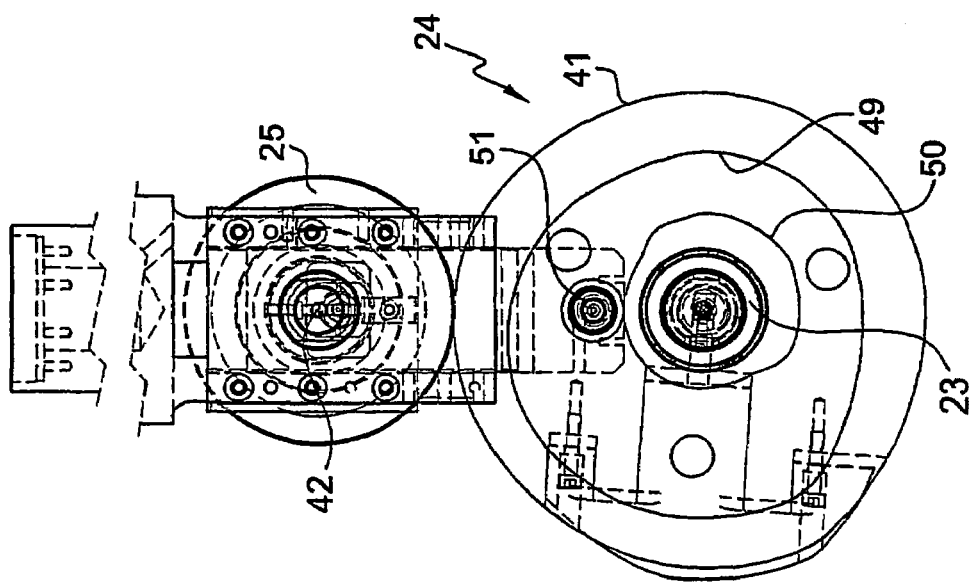
FIG. 9 is a view similar to that in FIG. 5 with the cam in another position, namely performing a pre-compression phase, FIG. 10 being a longitudinal cross-sectional view thereof.
Figure 11:
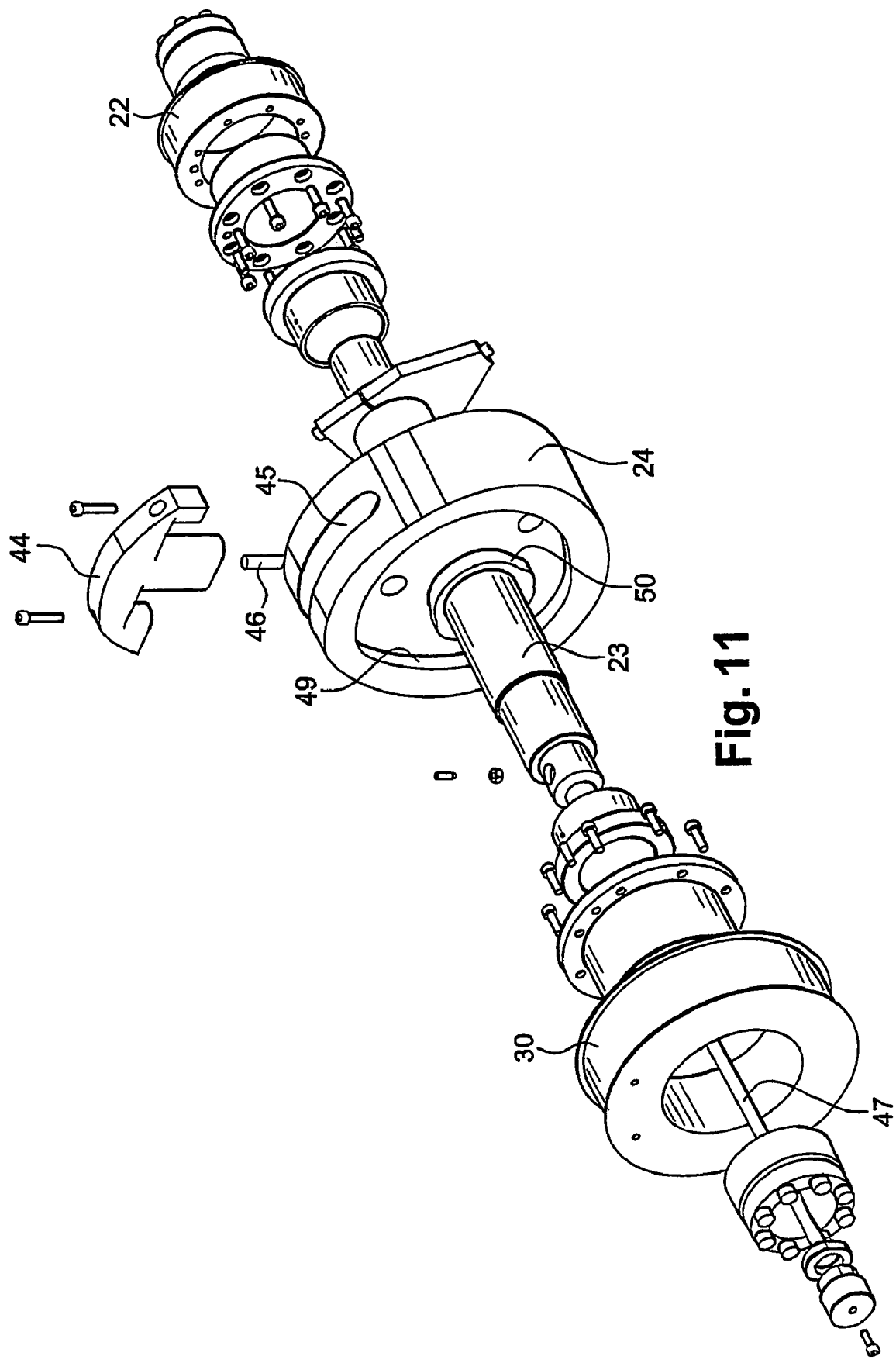
FIG. 11 is an exploded view of the upper cam.

As can be observed, especially in FIGS. 5, 7 and 9, this outer cam path (41) is not circular.

In addition and according to one aspect of the invention, it has a variable cam profile (43) capable of forming a protuberance relative to profile(41). This variability is obtained by means of an additional cam (44) capable of being moved radially relative to the rotating shaft (23) of cam (24) and engaging in a slot (45) made in cam (24). This additional cam (44) is attached to a radially moving shaft (46), the lower end of which is intended to cooperate with a shaft (47) perpendicular to the latter and colinear and centered relative to shaft (23).

The position of shaft (47) is adjustable within shaft (23) by means of an external screwable device (48) such that it enables it to be inserted into shaft (23) to a greater or lesser extent. It has, at (49), a cut face on which the lower end of shaft (46) rests.

Thus, simply sliding the lower end of shaft (46) onto cut face (48) causes extraction or retraction of cam (44), thus making it possible to modify the outer profile of said cam (24). The phase during which the variable cam profile is used will be described in greater detail later on.

Cam (24) also has two inner cam profiles referred to respectively as (49) and (50) intended to cooperate with one or two inner followers (51) (if there are two followers, each of said inner followers is positioned either side of the cam coaxially), also freely rotatably mounted on a rotation shaft (52) parallel to rotation shaft (42) of power follower (25) and accommodated on the lateral side pieces (45). This being so, it is therefore also joined to support (27) of lower punch (9). The centre-to-centre distance between power follower (25) and inner follower (51) is variable so as to be able to increase or reduce the volume of powder for each compressed tablet. Variation of this centre-to-centre distance is obtained by rotating a cam shaft (not shown) that is rotated by a wheel and worm pair (also not shown) controlled manually or by a motor.

This inner follower (51) is intended to cooperate with the two inner cam profiles of cam (24) as will be described in detail later on.

Lower cam (12) will now be described in greater detail making reference to FIGS. 12 to 14. This lower cam (12) also has a non-circular outer cam profile (53) intended to cooperate with rotatable lower power follower (13). It also has a variable cam profile (54) that operates substantially on the same principle as that of upper cam (24).

More precisely, this variable cam profile comprises a pre-compression cam (55) joined to a wedge adjuster (57) by means of a screw (56). The assembly thus formed is accommodated inside a slot (59) on the periphery of the outer cam path (53) of cam (12). In addition, the lower surface of the wedge adjuster (57) has a sloping slit (60) intended to accommodate the bevelled upper end of a tappet assembly (58), the other end of which cooperates with a cut face (61) on the rotary shaft of cam (12), said cut face being located on a shaft (62) perpendicular to tappet (58) and colinear and centred relative to rotating shaft (11).

The position of shaft (62) inside rotating shaft (11) can be adjusted by means of an external screwable device (63) so as to enable it to be inserted into shaft (11) to a greater or lesser extent.

Thus, translational movement of shaft (62) inside rotary shaft (11) consequently causes displacement of tappet (58) which, cooperating with slit (60), in turn causes radial extraction of the pre-compression cam (55).

Lower cam (12) also has a non-circular inner cam profile referred to as (64) intended to cooperate with an inner follower (65) also freely rotatably mounted on a rotation shaft parallel to the rotation shaft (14) of power follower (13) and accommodated on cross piece (15). This being so, it is therefore also joined to support (18) of upper punch (8). The centre-to-centre distance between power follower (13) and inner follower (65) is fixed.

The various operating phases of the respective cams will now be described depending on their rotation, reference being made to FIGS. 15 and 16.

If we consider, firstly, upper cam (24), the phase in which the die is filled with powdery material and leveled off is controlled by the inner follower(s) (51). It can be seen in FIG. 15a that said inner follower (51) rests on the two inner profiles (49, 50) of cam (24) but that, in contrast, the upper moveable power follower (25), being disengaged, does not cooperate with the outer cam path (41) of said cam. This being so, one obtains controlled, reduced upward movement of lower punch (9) making it possible to accomplish this leveling-off phase.

Simultaneously, during this phase (FIG. 16b) upper punch (8) is held in its upper, stationary position through cooperation of lower cam (12) with lower movable follower (13) and, more precisely, by cooperation of said movable follower with cam path (53) of said cam which, during this phase of rotation of the cam, has a purely circular profile. One can then perform a stage to pre-compress the powdery material inside the die. To achieve this, after rotation of substantially a quarter of a turn of the upper cam, one obtains cooperation of outer cam path (41) of said upper cam with upper power follower (25), the profile of said outer cam path in this location being such that it does not cause maximum lifting of lower punch (9) (FIG. 15b). This pre-compression is obviously obtained by cooperation with upper punch (8). To achieve this, lower cam (12), having also rotated roughly a quarter of a turn relative to the preceding stage, cooperates through its outer cam path (53) with lower power follower (13) on the variable cam profile (54), this being in its maximum extraction position (FIG. 16a'). In this configuration, inner follower (65) does not cooperate with inner cam profile (64). It should be noted that the positioning of variable cam profile (54) is located on the outer cam path (53) with the smallest diameter which is therefore equivalent to the lowest descent of upper punch (8). Thus, by using variable profile (54), one limits downward movement of said punch to an intermediate position making it possible to obtain pre-compression which encourages the venting of trapped air at the same time as the powdery material in the die.

Nevertheless, assuming that one wishes to dispense with this pre-compression stage, it is sufficient to leave the variable profile in its retracted position (FIG. 16a).

The cycle then moves on to the actual compression stage itself. This is materialised by the upper cam being controlled by the upper power follower (25), cooperating with the outer cam path of said cam in its most reduced form and therefore the lowest positioning of lower punch (9) (FIG. 15c). Simultaneously, the lower cam cooperates with the lower power follower (13), also on the most reduced outer cam path, thereby causing maximum lowering of upper punch (8).

The next stage corresponds to ejection of the compressed tablet. The upper cam cooperates with the upper moveable follower on the variable cam path (43) (FIG. 15d). This causes maximum lifting of lower punch (9) making it possible to cause ejection of the compressed tablet completed during the compression stage. This protuberance makes it possible, in particular, to produce compressed tablets of different thicknesses. To achieve this, lower punch (9) associated with the outer cam profile of upper cam (24) must be situated at the end of compression, i.e. more or less high in the die. This adjustable protuberance thus makes it possible to adjust lifting of the lower punch inside the die by a distance that is a function of the thickness of the compressed tablet to be produced.

Simultaneously, during this ejection phase, the lower cam that cooperates with the moveable lower follower causes lifting of the upper punch (8), thus making it possible to open the upper opening of the die and hence making it possible to remove the compressed tablet from the die.

Figure 17A:
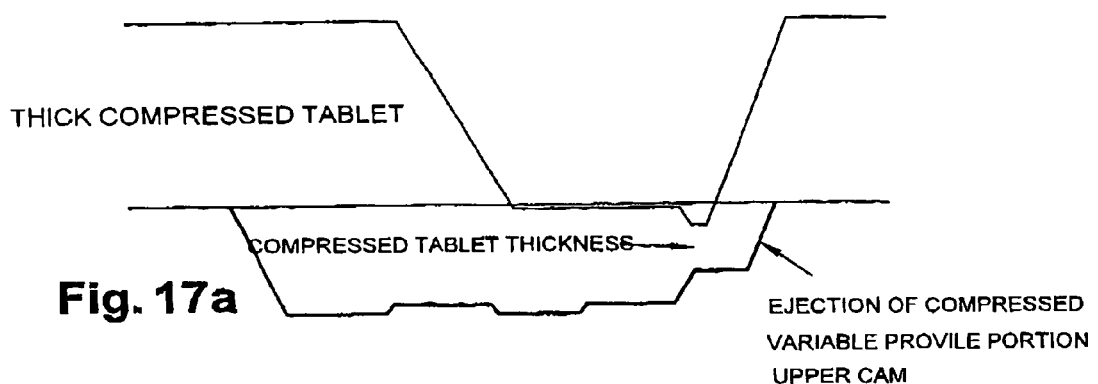
FIGS. 17a to 17c are graphs showing the travel of the upper and lower punches during one manufacturing cycle.
Figure 17B:
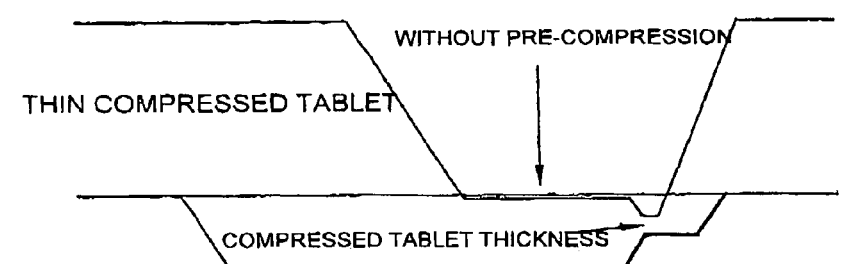
Figure 17C:
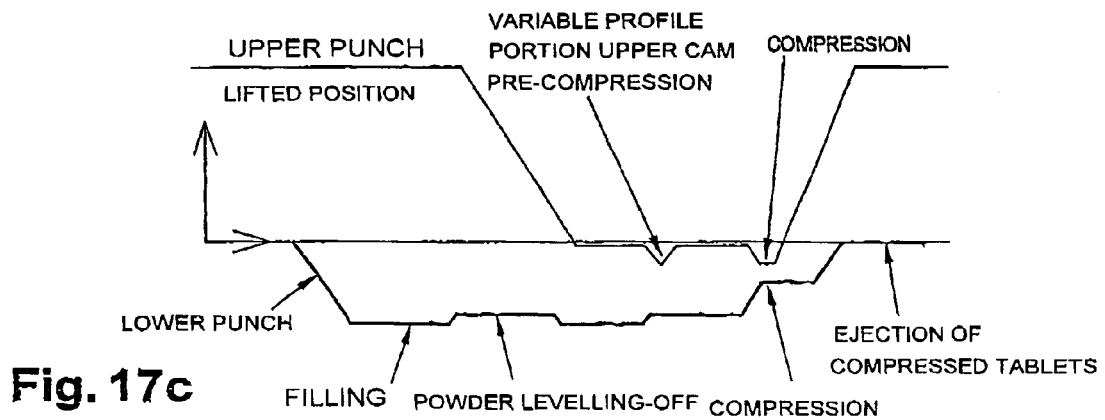

FIGS. 17a to 17c schematically show the respective position of the two punches, upper and lower punch respectively, during one manufacturing cycle to produce one compressed tablet.

FIG. 17a shows such a cycle for a thick compressed tablet.

FIG. 17b shows such a cycle for a thin compressed tablet without a pre-compression stage.

FIG. 17c shows such a cycle for a thin compressed tablet with a pre-compression stage.

Advantageously, the system according to the invention makes it possible to combine, during the compression or even the pre-compression stage, a mechanical effect that is inherent in the variable outer profile of the cams with a kinematic effect associated with possible variation of the rotation speed of the cams by using an electronically adjusted variable-speed drive mounted on the reduction gear (10) of drive shaft (11).

FIGS. 18a to 18e show the variation in the force F exerted by the pistons as a function of time T during the compression phase C and pre-compression phase P.

Figure 18A:
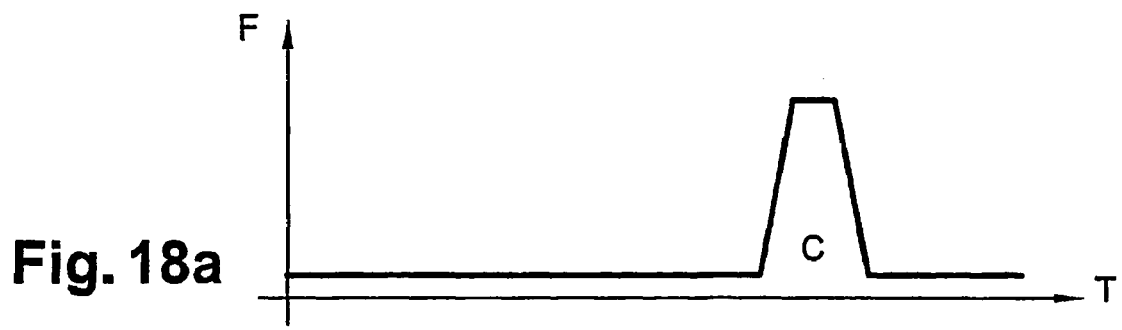
FIGS. 18a to 18e are graphs showing the use of the upper cam with and without use of a variable-speed drive on the reduction gear upstream from the drive shaft that drives rotation of said cam.
Figure 18B:
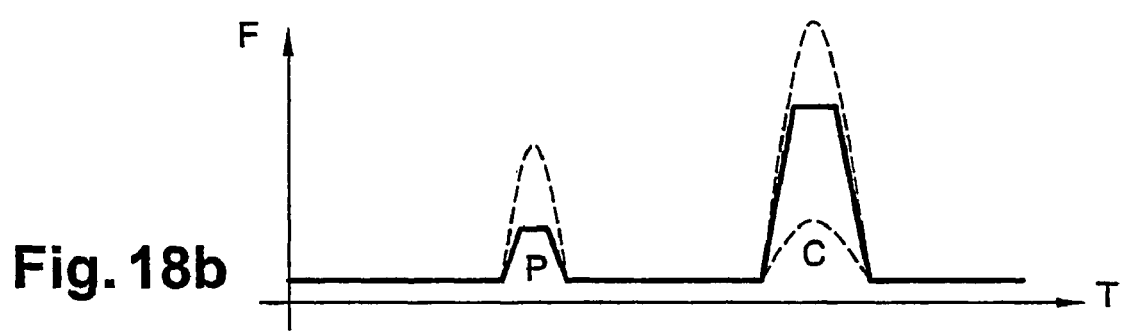
Figure 18C:
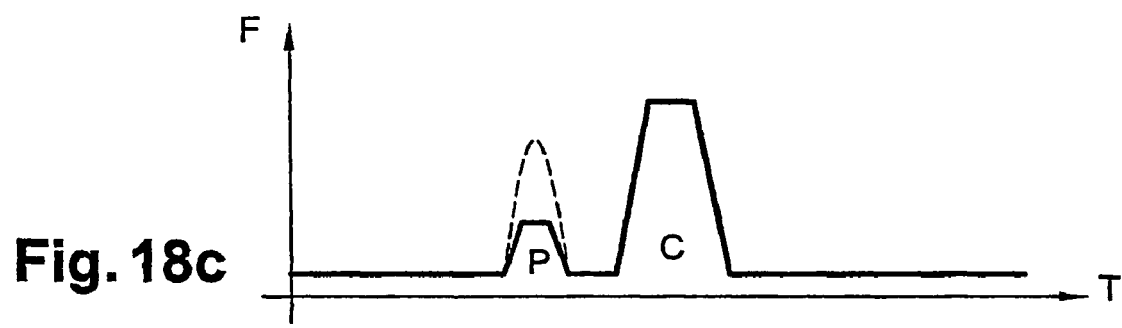
Figure 18D:
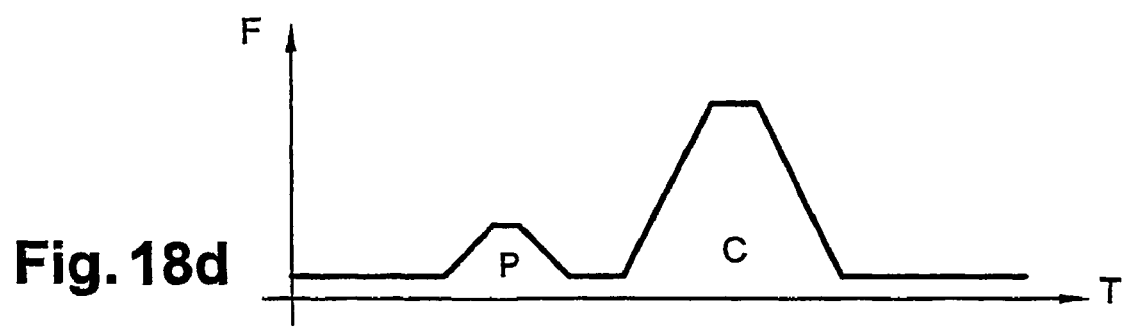
Figure 18E:
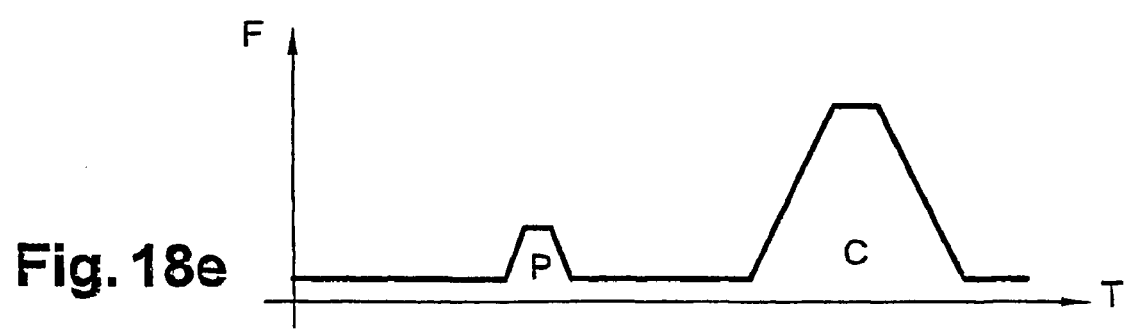

In FIGS. 18a and 18b, such variation is apparent without the use of a variable-speed drive. Assuming there is no variable-speed drive, the cams rotate at constant speed so that, firstly, the duration for which the force is exerted by the pistons is clearly defined in time and cannot be modified and, secondly, the interval that separates the pre-compression stage from the pressure stage is also fixed and is linked to the positioning of the variable outer profile on said cams. Only variation of said variable outer profile makes it possible to modify the intensity of force F (shown in dashed lines).

In contrast, use of the cam variable-speed drive makes it possible to modify both these parameters. Thus, in FIG. 18c, although the duration of the pre-compression and compression force respectively remains equal to that in the examples in FIGS. 18a and 18b, in contrast, the interval that separates these two phases is considerably reduced. This reduced interval between the two phases may prove very advantageous for a certain number of applications.

The actual duration of each of the pre-compression and compression forces respectively may be varied by using said variable-speed drive. Thus, in FIG. 18d, this duration has increased. Such an increased duration of the force may also prove advantageous to the extent that said force is applied more gently even though it reaches the same maximum intensity which depends on the outer profile of the selected cam.

Finally (FIG. 18e), one may wish to modify the actual duration of each of said forces besides the interval that separates them. This operating mode is also made possible by using the electronic cam variable-speed drive.

By altering the intensity of the compression and even pre-compression force and the speed at which said forces occur, the system according to the invention makes it possible to obtain all possible simulations of machines for manufacturing and producing solid products from a powdery material that are commercially available, such machines being known to have production capacities approaching 200,000 compressed tablets per hour.

Furthermore and to the extent that this system is not installed in series with such machines, the operator can perform a certain number of tests without having to stop the production line and can simultaneously optimise the operating parameters of said production line, in terms of its cycle rate in particular.

The full benefit of the system according to the invention is apparent in terms of its particular results which cannot be achieved by devices according to the prior art. One should also mention the ability of the system according to the invention to perform a pre-compression stage which improves the cohesion of compressed tablets thus produced and also, by means of adjustments that are simple to make, its ability to produce compressed tablets of varying thicknesses.

The invention claimed is:

1. A system for producing a solid product from a powdery material, comprising:
   means of feeding the powdery material;
   a die to contain said material and shape the solid product to be produced;
   an upper punch capable of cooperating with and in said die and moved translationally by a driven lower cam;
   a lower punch also capable of cooperating with and in said die, translationally moved by a driven upper cam;
   rotation of said upper and lower cams respectively being synchronised, wherein at least one of said cams has a variable outer profile to cause particular actions of at least one of the upper punch and the lower punch.

2. A system for producing a solid product from a powdery material as claimed in claim 1, wherein the of the upper cam has the variable outer profile to improve ejection of the solid product from the die after completion of said product.

3. A system for producing a solid product from a powdery material as claimed in claim 2, wherein the lower cam also has a variable outer profile intended to make it possible to obtain a product pre-compression phase prior to a strict compression phase.

4. A system for producing a solid product from a powdery material as claimed in claim 1, further comprising an electronic variable-speed drive that alters rotation speed of a rotary drive shaft of said cams so as to combine mechanical effect that is inherent in the use of one or more variable outer profiles on the cams with a kinetic effect that is inherent in possible variation of the rotation speed of said cams.

5. A system for producing a solid product from a powdery material as claimed in claim 1 wherein an outer cam profile of the upper cam is not circular and has a variable cam profile capable of forming a protuberance relative to said outer cam profile.

6. A system for producing a solid product from a powdery material as claimed in claim 4, wherein the variable cam profile comprises an additional cam capable of being moved radially relative to a rotary drive shaft of the upper cam, said additional cam being engaged in a slot in the upper cam and being joined to a radially moving shaft, the lower end of said shaft cooperating with a further shaft perpendicular to the radially moving shaft and colinear and centered relative to the rotary drive shaft of the upper cam.

7. A system for producing a solid product from a powdery material as claimed in claim 5, wherein the position of the further shaft is adjustable within the rotary drive shaft by means of an external screwable device such that the further shaft cam be inserted into the rotary drive shaft to a greater or lesser extent and has a cut face on which the lower end of the radially moving shaft rests.

8. A system for producing a solid product from a powdery material as claimed in claim 3, wherein the lower cam has a non-circular outer cam profile and said outer cam profile has a variable cam profile capable of forming a protuberance relative to said outer cam profile.

9. A system for producing a solid product from a powdery material as claimed in claim 8, wherein the variable cam profile comprises an assembly comprising a pre-compression cam accommodated inside a slot on a periphery of the outer cam profile of the lower cam and a lower surface of said assembly has a sloping slit to accommodate a bevelled upper end of a tappet assembly, an other end of the tappet assembly cooperates with a cut face on an adjusting shaft perpendicular to the tappet aseembly and colinear and centered relative to a rotary drive shaft of the lower cam.

10. A system for producing a solid product from a powdery material as claimed in claim 9, wherein a position of the adjusting shaft inside the rotary drive shaft of the lower cam can be adjusted by means of an external screwable device so as to enable the adjusting shaft to be inserted into the rotary drive shaft to a greater or lesser extent.

11. A system for producing a solid product from a powdery material as claimed in claim 1, wherein the lower cam imparts a straight movement to the upper punch by cooperation with a lower power follower loosely rotatably mounted relative to a rotation shaft parallel to a rotary drive shaft of said lower cam, said rotation shaft being joined to a set of columns, upper ends of said set of columns being connected to a support of the upper punch.

12. A system for producing a solid product from a powdery material as claimed in claim 11, wherein the lower cam has a non-circular inner cam profile to cooperate with an inner follower also freely rotatably mounted on a rotation shaft parallel to the rotation shaft of the lower power follower, thereby making it possible to momentarily prevent cooperation between the outer profile of the lower cam and the lower power follower.

13. A system for producing a solid product from a powdery material as claimed in claim 12, to centre wherein a center-to-center distance between the lower power follower and the inner follower is fixed.

14. A system for producing a solid product from a powdery material as claimed in claim 1, wherein the upper cam imparts a straight movement to the lower punch by cooperation with an upper power follower loosely rotatably mounted relative to a rotation shaft parallel to the rotating shaft of said upper cam, said rotation shaft being joined to a support of the lower punch.

15. A system for producing a solid product from a powdery material as claimed in claim 14, wherein the upper cam also has two non-circular inner cam profiles intended to cooperate periodically with one or two inner followers loosely rotatably mounted relative to a supporting shaft parallel to the rotating shaft of the upper cam and mounted between the two inner profiles of said cam, said supporting shaft being joined to means of imparting straight movement to the lower punch, thereby making it possible to momentarily prevent cooperation between the outer profile of the upper cam and the upper follower.

16. A system for producing a solid product from a powdery material as claimed in claim 15, wherein a center-to-center distance between the upper power follower and the inner follower is variable.

* * * * *

UNITED STATES PATENT AND TRADEMARK OFFICE
CERTIFICATE OF CORRECTION

PATENT NO.        : 7,517,204 B2
APPLICATION NO.   : 10/557084
DATED             : April 14, 2009
INVENTOR(S)       : Henri Mercado Page 1 of 1

It is certified that error appears in the above-identified patent and that said Letters Patent is hereby corrected as shown below:

TITLE PAGE:

Item (73) Assignee: should read

--Bourg en Bresse--.

CLAIMS:

Col. 10, Claim 13, line 2, delete "to centre".

Signed and Sealed this

Twenty-third Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,517,204 B2  Page 1 of 1
APPLICATION NO. : 10/557084
DATED : April 14, 2009
INVENTOR(S) : Henri Mercado It is certified that error appears in the above-identified patent and that said Letters Patent is hereby corrected as shown below:

TITLE PAGE:

Item (73) Assignee: should read

--Bourg en Bresse--.

CLAIMS:

Col. 10, Claim 13, line 8, delete "to centre".

This certificate supersedes the Certificate of Correction issued June 23, 2009.

Signed and Sealed this

Twenty-first Day of July, 2009

JOHN DOLL
*Acting Director of the United States Patent and Trademark Office*